United States Patent
Gallop

(10) Patent No.: US 6,411,983 B1
(45) Date of Patent: Jun. 25, 2002

(54) MECHANISM FOR MANAGING THE LOCKING AND UNLOCKING OF OBJECTS IN JAVA

(75) Inventor: Patrick George Gallop, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/067,577

(22) Filed: Apr. 28, 1998

(30) Foreign Application Priority Data

Nov. 27, 1997 (CA) .............................................. 2222389

(51) Int. Cl.[7] .............................................. G06F 9/46
(52) U.S. Cl. ...................................... 709/104; 709/107
(58) Field of Search ................................ 709/100, 102, 709/104, 107; 707/8, 206; 711/6

(56) References Cited

U.S. PATENT DOCUMENTS

| | | | | |
|---|---|---|---|---|
| 5,187,790 A | * | 2/1993 | East et al. ................... | 395/725 |
| 5,669,002 A | * | 9/1997 | Buch .......................... | 395/726 |
| 5,862,376 A | * | 1/1999 | Steele, Jr. et al. .......... | 709/107 |
| 5,968,157 A | * | 10/1999 | Joy et al. ..................... | 710/200 |
| 5,995,998 A | * | 11/1999 | Furlani et al. .............. | 709/102 |

OTHER PUBLICATIONS

A,. Blomdell, "Efficient Java Minitors", IEEE, 2001, pp. 270–276.*

Daynes et al. "Locking in OODBMS Client Supporting Nested Transactions" IEEE, pp 316–323, 1995.*

Jing et al. "Distributed Lock Management for Mobile Transactions" IEE, pp 118–125, 1995.*

* cited by examiner

*Primary Examiner*—Alvin Oberley
*Assistant Examiner*—S. Lao
(74) *Attorney, Agent, or Firm*—F. Chau & Associates, LLP

(57) ABSTRACT

A mechanism for managing the locking and unlocking of objects. The mechanism comprises a transition vector having an ordered set of transition elements. Each of the transition elements includes a locking function or a pointer to the locking function and an unlocking function or a pointer to the unlocking function. When an object is created a transition vector is assigned to the object. The object includes a reference element which references a transition element in the vector. In response to a request to lock the object, the locking function in the transition element is invoked and the next transition element is assigned to the object and the reference element in the object is updated. For a request to unlock the object, the unlocking function in the transition element is invoked and the previous transition element is assigned to the object and the reference element is updated. The mechanism improves execution overhead by providing an implicit count for determining the lock count on an object. The mechanism also features typed transition vectors for structured locking/unlocking and unstructured locking/unlocking operations.

23 Claims, 5 Drawing Sheets

MECHANISM FOR MANAGING THE LOCKING AND UNLOCKING OF OBJECTS IN JAVA

FIELD OF THE INVENTION

The present invention relates to computer systems, and more particularly to a mechanism for managing the lock and unlock operations on objects.

BACKGROUND OF THE INVENTION

Threading is a feature of object oriented computer languages such as the Java programming language. A thread is defined as a single sequential flow of control in a computer program. Multiple threads running in a single program allow the program to perform multiple tasks at the same time. Because a thread comprises a sequential flow of control, each thread must reserve some of its own resources within the running program.

Because each thread will reserve resources, programming languages such as Java provide mechanisms for serializing critical sections of the program code. These mechanisms include synchronized methods and synchronized statements where locking and unlocking is done at the object level. An object of this form is termed a monitor. Java includes a set of rules for object locking and unlocking that must be adhered to. As will be familiar to those skilled in the art these rules and other considerations include:

(1) Language defined exceptions are thrown if a thread attempts to lock/unlock an object reference that is NULL or if a thread attempts to unlock an object that it does not hold a lock on.

(2) A thread can do nested locks on an object. The object is only available for other threads to lock if the same number of nested unlocks are done. Thus, some form of bookkeeping must be maintained since a thread can, at any time, relinquish control of the object to another thread and later acquire control of the object at a later time with the same lock count in place.

(3) The Java language defines some rules with respect to the transmission of values across threads when synchronization is used. This requires special considerations particularly in a multi-processor environment.

(4) A thread can do unstructured and uncontrolled object locking and unlocking by using certain native programming interfaces (in particular, JNI monitorEnter( ) and monitorExit( ). The JNI Detachthread( ) API native interface also states that all objects locked by the calling thread must be unlocked.

As a result of these requirements, synchronization may take a substantial part of an application's time. This is even true of an application that is single threaded since the core Java libraries do object locking and unlocking in commonly used classes.

Furthermore, it may also be desirable to keep track of those objects locked by a thread, in certain environments. One such example is a debugging environment.

Accordingly, there remains a need for a mechanism for managing synchronization, i.e. locking and unlocking of objects, in Java.

BRIEF SUMMARY OF THE INVENTION

The present invention provides a mechanism for managing the locking and unlocking of objects in an object oriented computing environment.

The mechanism according to the invention reduces the execution overhead of the initial and first few nested lock and unlock operations on an object. The mechanism is also suitable for deep nested locking, even though such locking is infrequently used in typical programming.

The mechanism according to the present invention is suitable for single and multi-threaded environments and different locking patterns such as structured and unstructured locking.

Advantageously, the mechanism utilizes minimal space in an object to support the improved locking and unlocking operations. Object space is typically at a premium, and it is therefore desirable to reduce the amount of space that must be dedicated in each object in support of fast locking and unlocking.

The mechanism according to the invention comprises what is termed as typed monitors and a set of operations which can be performed on the monitors. A monitor of a given type is enabled by a monitor transition vector. The operations which can be performed on the typed monitors provide for further execution and space optimization.

According to the invention, a monitor transition vector is assigned to an object when the object is first created. The monitor transition vector comprises a set of monitor transition elements which are ordered. Each transition element, in turn, comprises two transition functions: a locking function and an unlocking function. The locking function is invoked in response to a request to lock the object, and the unlocking function is invoked in response to an unlock request. Each transition function will assign a new transition element to the object, i.e. assign a new element of the transition vector which will be used for the next lock or unlock request. Each transition function may also update preselected information contained in the object or in the address space.

The monitor transition vector links the locking and unlocking operations and provides implicit lock counts through the assignment of transition elements. This improves the execution performance by eliminating the need to perform tests to determine if the synchronization comprises a first lock, a shallow lock or a deeply nested lock.

According to another aspect of the invention, a transition vector is provided for structured locking and another vector is provided for unstructured locking. Each of the transition vectors defines the object's locking type or class and includes its own set of transition functions. The transition functions define the set of operations that are performed in response to lock and unlock requests.

When the object is first created, a structured transition vector is assigned to the object. If it is later determined that a particular lock or unlock request is unstructured, the type of the object is changed to unstructured by modifying the transition vector associated with the object.

In a first aspect, the present invention provides a mechanism for managing the locking and unlocking of an object by a thread, said mechanism comprising: (a) a transition vector having a plurality of ordered transition elements; (b) a reference element for referencing one of the transition elements in said transition vector, and said reference element being accessible in the object; (c) each of said transition elements including locking means for locking the object and unlocking means for unlocking the object; (d) said locking means having means for assigning said reference element to the next transition element in response to a locking request for the object by the thread; and (e) said unlocking means having means for assigning said reference element to the previous element in response to an unlocking request for the object by the thread.

In a second aspect, the present invention provides a method for managing the locking and unlocking of an object by a thread, said method utilizing a transition vector comprising an ordered set of transition elements and each of said transition elements comprising a structure having first and second function pointers, said first function pointer referencing a locking function for locking said object and said second function pointer referencing an unlocking function for unlocking said object, said method comprising the steps of: (a) assigning a transition vector to an object when the object is created, wherein a reference element in the object is assigned to the first transition element in the transition vector; (b) invoking the locking function in the currently referenced transition element in response to a request from the thread to lock the object, and assigning said reference element to the next transition element in the transition vector; (c) invoking the unlocking function in the currently assigned transition element in response to a request from the thread to unlock the object, and assigning said reference element to the previous transition element in the transition vector; (d) generating an exception in step (c) if a request is made by a thread to unlock an object which has not been locked.

In a third aspect, the present invention provides an article of manufacture in a data storage media recorded with a computer program which, in combination with a general purpose computer loaded with an operating system and runtime library means, equipped to read into memory and execute program data from the data storage media, constituting a method for managing the locking and unlocking of an object by a thread, said method utilizing a transition vector comprising an ordered set of transition elements and each of said transition elements comprising a structure having first and second function pointers, said first function pointer referencing a locking function for locking said object and said second function pointer referencing an unlocking function for unlocking said object, said method comprising the steps of: (a) assigning a transition vector to an object when the object is created, wherein a reference element in the object is assigned to the first transition element in the transition vector; (b) invoking the locking function in the currently referenced transition element in response to a request from the thread to lock the object, and assigning said reference element to the next transition element in the transition vector; (c) invoking the unlocking function in the currently assigned transition element in response to a request from the thread to unlock the object, and assigning said reference element to the previous transition element in the transition vector; (d) generating an exception in step (c) if a request is made by a thread to unlock an object which has not been locked.

BRIEF DESCRIPTION OF THE DRAWINGS

Reference will now be made to the accompanying drawings which show, by way of example, preferred embodiments of the present invention and in which.

DETAILED DESCRIPTION OF THE PREFERRED EMBODIMENTS

The present invention provides a mechanism for managing the locking and unlocking of objects in an object oriented computing environment. In the following description, the mechanism according to the invention is described in the context of the Java programming language.

An object is locked and unlocked by a thread. A thread as will be understood by those skilled in the art comprises a single sequential flow of control in a computer program. Multiple threads running in a single program allow the program to perform multiple tasks at the same time. Because a thread comprises a sequential flow of control, each thread must reserve some of its own resources within the running program. Resources are thus reserved by locking object(s), and subsequently released by unlocking the object(s). The present invention provides a mechanism for managing the locking and unlocking of objects by a thread.

Figure 1:
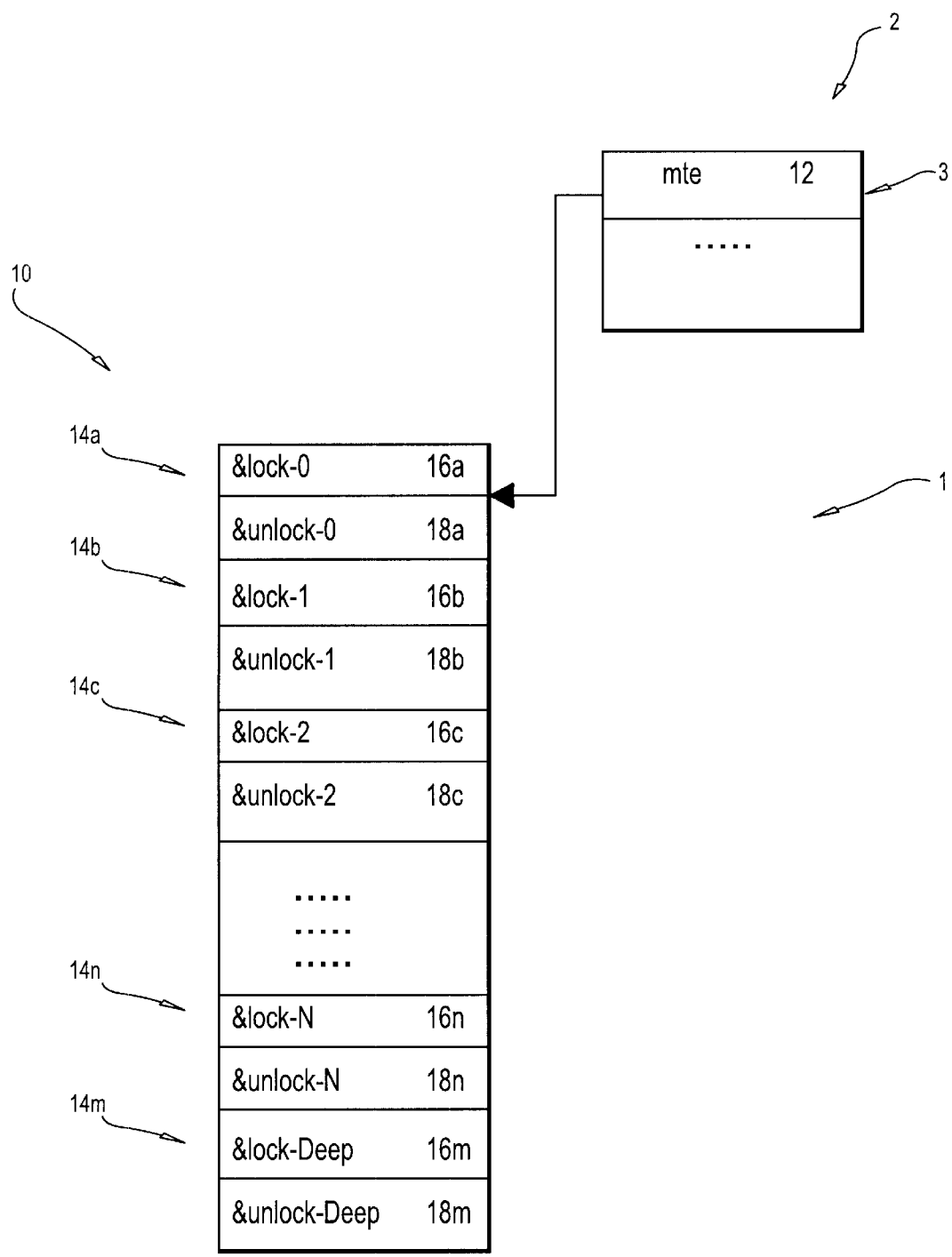
FIG. 1 is a schematic representation of a mechanism according to the present invention for managing the locking and unlocking of an object.

Reference is first made to FIG. 1 which shows, in schematic form, a mechanism 1 according to the present invention. The mechanism 1 comprises a monitor transition vector 10. When an object 2 is first created, the object 2 is assigned a monitor transition vector 10. As shown in FIG. 1, the object 2 includes a monitor transition element field 3 which stores an address or a pointer 12 which references the monitor transition vector 10 associated with the object 2.

The monitor transition vector 10 comprises an ordered set of monitor transition elements 14, shown individually as 14a, 14b, 14c, . . . , 14n, 14m. When the object 2 is initially create the monitor transition field 3 in the object 2 stores the address or pointer 12 to the first monitor transition element 14a in the monitor transition vector 10. During subsequent lock and unlock operations, the monitor transition element 14 currently assigned to the object 2 (i.e. referenced by the pointer 12) is updated as will be described in more detail below. In a typical 32-bit environment, 4 bytes are reserved in the object 2 for the monitor transition element field 3.

Each monitor transition element 14 is implemented as a structure containing two function pointers: &lock 16 and &unlock 18. The &lock pointers 16, shown individually as 16a, 16b, 16c, . . . , 16n, 16m, each reference a lock transition function, whereas the &-unlock pointers, shown individually as 18a, 18b, 18c, . . . , 18n, 18m, each reference an unlock transition function. Accordingly, each transition function 16 or 18 is linked through two levels of indirection, i.e. indirect addressing through the monitor transition element field 3 in the object 2 by the pointer 12 and the &lock or &unlock pointers 16, 18. By storing the code for the lock transition functions in the elements 14 of the vector 10, one level of indirection can be removed, however, it is necessary that the bodies of the functions be of known size. The monitor transition element field 3 also provides additional functionality as will be described below.

The lock transition function 16 is invoked in response to a request to lock an object 2, whereas the unlock transition function 18 is invoked in response to a request to unlock an object 2. Each transition function 16 or 18 is implemented to assign a new element 14 in the vector 10 associated with the object 2 in response to a lock or unlock request. As will be described in more detail below, the transition functions 16 or 18 can also include code to update selected data contained in the object 2 or stored in memory.

Referring to FIG. 1, the monitor transition vector 10 is implemented as a contiguous array of N+2 elements denoted by the reference 14. The elements 14 fall into three categories: (1) an initial monitor transition element 14a (e0); (2) a set of N elements 14b to 14n (e1 to eN); and (3) a deep element 14m (eDeep).

The initial monitor transition element 14a is assigned to an object 2 (i.e. referenced in the monitor transition element field 3) when the object 2 is first created. The initial element 14a is also assigned when a thread eventually unlocks the object 2 or wants to make the object 2 available for locking by other threads. The lock transition function 16a for the initial element 14a performs the initial lock request on the object 2 in response to the request from the thread. When the lock is successful, the lock transition function 16a assigns a new monitor transition element e1 to the object 2 which is indicated by reference 14b in FIG. 1. The new monitor transition element 14b (e1) will be used for the next locking request. If the unlock transition function 18a is first invoked by the thread, the unlock function 18a will generate an exception condition since the thread does not have a lock on the object 2.

The set of N monitor transition elements e1–eN are indicated by references 14b to 14n in the transition vector 10 shown in FIG. 1 and are used for shallow locking. The lock transition functions 16 for these elements e1–eN respond to locking requests issued by the thread by validating that they hold a lock on the object 2. If the validation is successful, the lock function 16 assigns the next element 14 in the vector 10 to the object 2. For example, if the validation from the lock function 16b is successful, the function 16b assigns the next element 14c to the object 2.

The unlock transition functions 18 for these elements 14 perform the reverse operation. (As will be described in more detail below, the unlock transition function for unstructured locking includes an additional lock ownership test.) In response to an unlock request from the thread, the previous monitor transition element 14 is assigned to the object 2, for example, the second monitor transition element 14b (FIG. 1). In this way, the monitor transition vector 10 provides a lock count for the object 2 where the lock count is determined from the current transition element 14 that is assigned to the object 2. For example, if the third transition element 14c is assigned to the object 2, then the lock count on the object is 2. Similarly, for the second transition element 14b, the lock count is 1. It is to be understood that there is no strict requirement on the value for N, however, it is desirable that N be chosen so that it is unlikely that the object is ever assigned the last transition element eDeep in the vector 10.

The last monitor transition element eDeep is indicated by reference 14m in FIG. 1. The monitor transition element eDeep or 14m is used when a high number of locking requests are performed. The transition element eDeep includes the transition functions lock-Deep( ) and unlock-Deep( ). The lock function lock-Deep( ) validates that the thread holds a lock on the object 2. If the validation is successful, the lock function lock-Deep( ) updates a lock count which is maintained in data associated with the object 2. Unlike the previous monitor transition elements e0–eN, a new element is not assigned unless a regression is made to element eN, i.e. unless an unlock request is performed to remove the deep lock eDeep on the object 2.

In another aspect, the monitor transition vector 10 provides a mechanism for managing structured and unstructured locking and unlocking. Locking is properly structured if a lock operation on an object precedes an unlock operation on the same object. For example, lock(A) unlock(A) is structured, whereas unlock(A) lock(A) is unstructured. In the Java language, an exception is generated in the latter case on the first "unlock" operation. In other words, Java generates an exception when a thread attempts to unlock an object on which it does not hold a lock.

For nested locking operations, a properly nested lock will have a form such as—lock(A) lock(B) unlock(B) unlock(A), whereas, an improperly nested lock will have a form such as—lock(A) lock(B) unlock(A) unlock(B). If the locking is improperly nested, the locking is also termed unstructured.

The first unstructured locking example described above (i.e. unlock(A) lock(A)) typically occurs as a result of improper use of the Java Native Interface (JNI) locking and unlocking methods—monitorEnter( ) and monitorExit( ). In the case of nested locking (i.e. the second condition described above), the Java language does not require that locking operations have to be properly nested. Therefore, an exception will not necessarily be thrown if the locking operations are not properly nested. In structured nested locking, locks on objects are released in the reverse order that they are acquired. This property is advantageously exploited by the present invention as will be described.

In order to provide structured and unstructured locking operations, the monitor transition vector 10 is "typed" or "classed". According to this aspect of the invention, the type or class of a monitor is defined by the monitor transition vector 10 associated with the monitor. A set of typed monitor transition vectors allows one set of actions to be performed for structured locking on an object and another set of actions to be performed for unstructured locking. Each monitor transition vector in the set has its own lock transition functions. Referring to FIG. 1, the class or type information of the monitor is determined from the monitor transition element field 3 stored in the object 2. The initial type or initial class of a monitor is defined by the type of the monitor that is assigned to the object when the object is initially created. In turn, the order of a given type or class is defined to be the number of monitor transition elements 14 in the associated monitor transition vector 10.

According to another aspect, the type of a particular monitor can be changed by modifying the monitor transition vector 10 associated with the object 2. This operation is termed as "casting". For the monitor transition vector 10 shown in FIG. 1, the casting operation is performed by assigning the monitor transition element field 3 in the object 2 an element belonging to another monitor transition vector. The casting operation may also be accomplished by modifying data in the general address space alone or together with data contained in the object.

To provide greater flexibility, the casting operation does not require that the originating monitor transition vector and the cast monitor transition vector have the same order, i.e. there is no requirement that the two monitor transition vectors must have the same number of elements. It will however be understood that utilizing vectors with the same order may simplify a particular implementation of the casting operation.

The casting operation is useful for a situation such as where a monitor is changed from structured to unstructured type. The casting operation is used to convert between the different schemes for managing the locks. Advantageously, the casting operation maintains preservation of lock ownership, lock counts and the threads waiting to lock the object.

According to this aspect of the invention, the type of a monitor is "cast" to unstructured if it is determined that a particular lock or unlock request could lead to unstructured locking. For example, the cast operation is performed on each JNI monitorEnter( ) and JNI monitorExit( ) call. It will be understood that the cast operation is performed on an object by object basis. Furthermore, it is unlikely for the cast operation to occur as a result of locking operations in Java bytecode.

In the case of a lock request, the cast operation, i.e. casting, is performed after the lock request is completed. In the case of an unlock request, a check is first made to ensure that the thread has a lock on the object. If the thread has a lock on the object, the casting is done and then the unlock request is performed. If the thread does not have, i.e. own, a lock on the object, an exception is generated.

In another aspect, the mechanism according to the present invention provides "cross thread" casting which allows a thread to perform casting on an object for which it does not have a lock. In this case, the object can either be unlocked, or locked by another thread. The cross thread casting operation is described in further detail below in connection with particular implementations of the mechanism.

According to another aspect, the mechanism provides an operation for changing the behaviour of a class of monitors by modifying one or more of the transition functions in the monitor transition vector. Referring to FIG. 1, the behaviour of the monitor transition vector 10 is changed by modifying one or more of the function pointers 16, 18 in the monitor transition elements 14. The term "plumbing" is used when a transition function of a monitor transition element 14 is modified.

The set of monitors 14 that are affected by a plumbing operation is dependent on the placement of the particular monitor transition element that is being modified. If the monitor transition element is a global, then all monitors of that class will modified. If the transition element being modified is in thread specific storage, i.e. storage that is particular to a given thread as will be described in more detail, then only monitors of that class and for the thread being plumbed are affected.

The term "cross thread plumbing" is used to define the case where one thread is doing plumbing on a different thread. That is, one thread is modifying a monitor transition element and the element is contained in storage owned by another thread. The term global plumbing is used to define the case where one thread is doing plumbing on an element in global storage.

It will be understood that the casting and plumbing operations must be used in a defined and controlled fashion. For example, in the case of a plumbing request which modifies thread specific storage, serious complications could arise if the thread specific storage is de-allocated prior to the plumbing operation.

In the following description, two specific implementations for the mechanism according to the invention are provided. In a first implementation, the mechanism utilizes thread specific data and requires the address of such data during the initial locking operation on an object. In another implementation, the mechanism does not use thread specific data for "shallow" or early locking operations, but does utilize the thread specific data for "deep" locking operations as will be described below.

Figure 2:
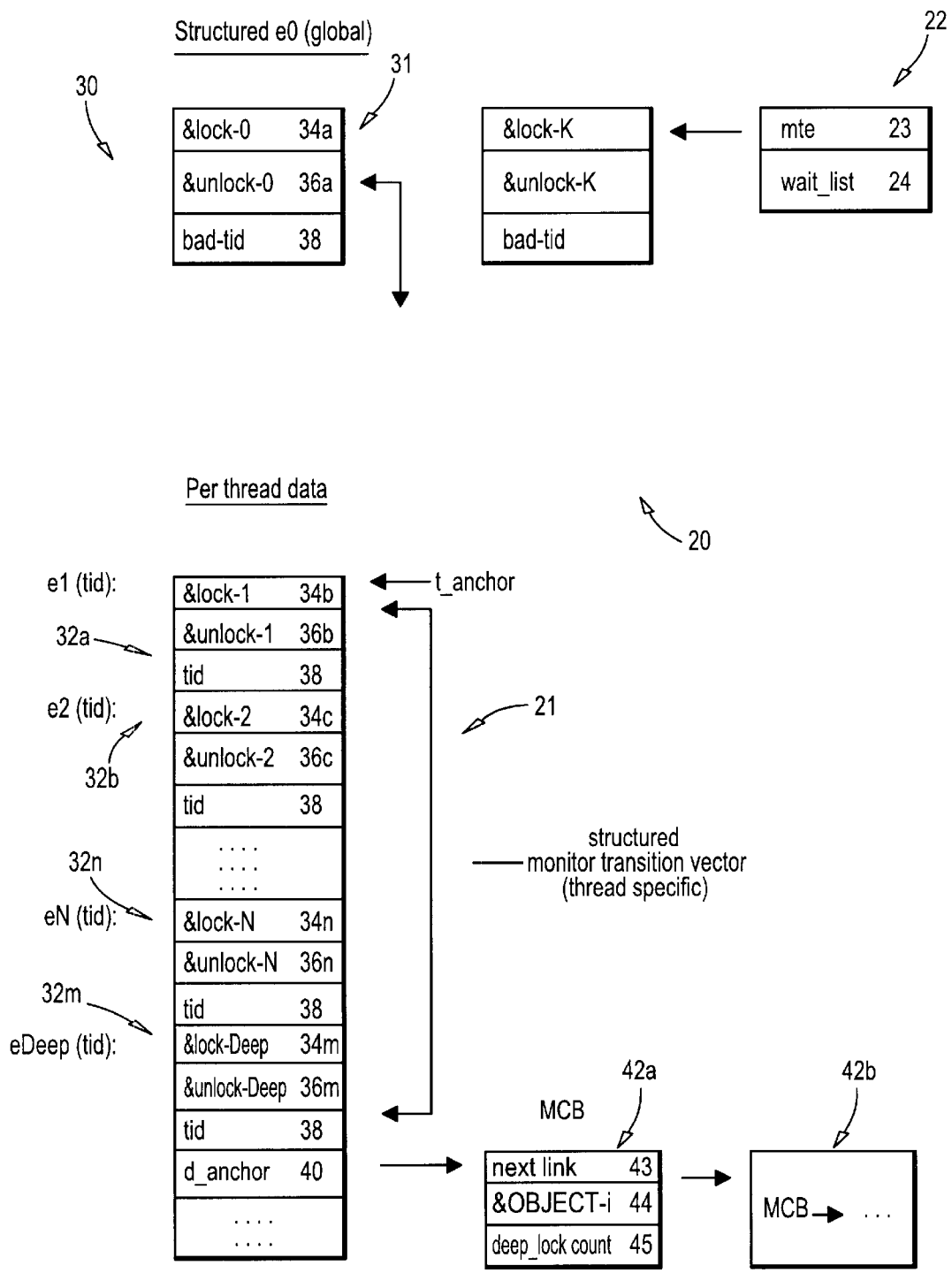
FIG. 2 is a schematic representation of data structures for the mechanism of FIG. 1 according to a first embodiment of the invention.

Reference is made to FIG. 2, which shows a first embodiment of a mechanism 20 according to the present invention which utilizes thread specific data. The mechanism 20 comprises a monitor transition vector 30 which is split between a first monitor transition element 31 (e0) which resides in global storage and remaining elements 32 (e1–eN and eDeep) which reside in storage local to the thread. The remaining transition elements 32 are shown individually as 32a, 32b, . . . , 32n and 32m in FIG. 2. When an object 22 is first created, the monitor transition vector 30 assigned to the object 22 is "typed" for structured locking. It will be appreciated that an unstructured monitor transition vector is utilized to manage unstructured locking operations when they arise.

Each of the monitor transition elements 31, 32 comprises a structure having two function pointers: &lock 34 and &unlock 36. The transition elements 31, 32 include an additional field 38 for storing a thread identifier or tid. The tid field 38 identifies the thread which owns a lock on the object 22. Each of the lock function pointers 34 reference a locking function, i.e. lock-no, and each of the unlock function pointers 36 reference an unlocking function, i.e. unlock-no as described above with reference to FIG. 1.

The locking functions lock-0( )-lock-Deep( ) form a set of N+2 functions which are used for structured locking of an object as follows. The first locking function lock-0( ) is used to acquire the first lock on an object. The locking functions lock-1( )-lock-N( ) are then used to acquire the next N shallow locks on the object. The locking function lock-Deep( ) is used to acquire all further, i.e. deep, locks on the object.

Similarly, the unlocking functions unlock-0( )-unlock-Deep( ) form a set of N+2 functions which are used for structured unlocking of an object. The first unlocking function unlock-0( ) merely throws an exception if a thread attempts to unlock an object which has not been locked. The unlocking functions unlock-1( )-unlock-N( ) are used to unlock the object that has a lock count from 1 to N respectively. The unlocking function unlock-Deep( ) is used to unlock the object that has a deep lock count.

As shown in FIG. 2, the object 22 includes a monitor transition element field 23 which stores an address or pointer which references a transition element in the monitor transition vector 30. When an object 22 is first created, the object 22 is assigned the first monitor transition element 31 in the monitor transition vector 30. On subsequent lock operations, the monitor transition field 23 is updated to reference the monitor transition element 32 currently assigned to the object 22.

The first monitor transition element 31 or e0 which resides in global storage is used for structured locking. As described above, the first element 31 contains the address of the initial locking function 34a or lock-0( ), the unlocking function 36a or unlock-0( ), and the constant 38 or bad-tid. The constant 38a is selected so that it can never collide with a valid thread ID. The address of the first monitor transition element 31 is maintained as a constant in the global space.

The remaining N+1 transition elements 32 in the vector 30 are unique to each thread and stored in thread specific data space 21. The thread is identified by the thread identifier lid stored in field 38. The base address of the elements 32 is referenced by a pointer t_anchor. A function t_Anchor( ) is used by a thread to determine the t_anchor value, i.e. the starting address of this thread specific storage. It will be understood that the function t_Anchor( ) is only called by the locking function lock-0( ) when the initial lock is performed on the object 22. The function t_Anchor( ) is not called by any of the other locking or unlocking functions.

It is preferable that the function t_Anchor( ) execute rapidly. On a hardware platform that has a large register set, such as the known Power PC™ architecture, the function t_Anchor( ) may be implemented by dedicating a register to hold this value. The register is dedicated on a per thread basis. On a hardware platform with a small register set, such as the known Intel architecture, particular operating system protocols may be employed. For example on the Windows™ platform, static thread local storage (static TLS) may be utilized as will be understood by those skilled in the art.

As shown in FIG. 2, a linked list anchor field 40 or d_anchor is provided to link a series of monitor control blocks 42 (MCB's) shown individually as 42a, 42b, . . . The monitor control blocks 42 are used by the deep locking function 34m or lock-Deep( ) and the deep unlocking function 36m or unlock-Deep( ). The linked list 40 includes an entry for each object that is deeply locked by the thread. The linked list 40 may be managed in a number of ways using conventional techniques. For the following description, it is assumed that there is at least one pre-allocated zeroed out monitor control block 42 in the list 40 and that entries in the list 40 are only de-allocated when the thread terminates.

As shown in FIG. 2, each monitor control block 42 includes a next link field 43, an object reference field 44 and a deep_lock count field 45. The next link field 43 points to the next monitor control block 42b in the linked list 40. The object reference field 44 holds an object reference &OBJECT-i for identifying the deeply locked object. A zero value in the object reference field 44 indicates that the monitor control block 42 is unused. The deep_lock count field 45 indicates the number of calls to the deep lock routine lock-Deep( ). A non-zero value of M in the deep_lock count field 45 indicates that there have been M-1 such calls.

In this implementation, the object 22 includes two fields the monitor transition element field 23 and a wait_list field 24 for synchronization as shown in FIG. 2. In a 32-bit environment, these two fields 23, 24 use 4 bytes each. (In a variation described below, the storage requirement in the object 22 is reduced to 4 bytes by eliminating the wait_list field 24.) When an object is created, the monitor transition element field 23 is assigned the address of the first element 31. Subsequently, the monitor transition element field 23 is updated by the locking functions lock-K( ) and the unlocking functions unlock-K( ) and by also by casting operations. At any point in time, the monitor transition element field 23 will contain a reference either to the first monitor transition element 31 or e0 or another monitor transition element 32. The wait_list field 24 indicates if there are any threads waiting to lock the object 24. The wait_list field 24 will hold a non-zero value if there is at least one thread waiting to lock the object 22. The value in the wait_list field 24 may comprise a count of waiting threads, a queue of waiting threads, or the like.

The implementation of the structured locking routines lock-K( ) will now be described with reference to the following pseudocode listings.

```
The initial locking routine lock-0():
    1:    result = compareAndSwap(&mte, &e0, _Anchor( ))
    2:    if (result == TRUE)
    3:    then
    3a:            the locking process terminates
    4:    else
    4a:            the wait_list of the object is updated, if necessary,
                   with a non-zero value to indicate that a thread is
                   waiting to lock the object
    4b:            the thread waits as necessary until it can obtain a lock on
                   the object
The shallow locking routines lock-1( ) to lock-N-1( ) :
    1:    result = currentThreadOwnsLock(o)
    2:    if (result == TRUE)
    3:    then
    3a:            increment the mte field of the object by 12
    3b:            the locking process terminates
    4:    else
    4a:            call lock-0( ) to lock the object
    4b:            the locking process terminates when lock-0( ) completes
The shallow locking routine lock-N( ):
    1:    result = currentThreadOwnsLock(o)
    2:    if (result == TRUE)
    3:    then
    3a:            increment the mte field of the object by 12
    3b:            search the d_anchor list for a free entry, or allocate one ;
                   call this entry M
    3c:            place M at the front of the d_anchor list
    3d:            set the deep_lock count in M to 1
    3e:            set the &OBJECT-i field in M to the object reference
    3f:            the locking process terminates
    4:    else
    4a:            call lock-0( ) to lock the object
    4b             the locking process terminates when lock-0( ) completes
The deep locking routine lock-Deep( ):
    1:    result = currentThreadOwnsLock(o)
    2:    if (result == TRUE)
    3:    then
    3a:            M = the first object at the head of the d_anchor list
    3b:            F = &OBJECT-i field of M
    3c:            if (F is NOT the object to be unlocked)
    3d:            then
```

-continued

| | | |
|---|---|---|
| 3e: | | M = the entry in the d_anchor list with an &OBJECT-i field equal to the object to be unlocked |
| 3f: | | M is moved to the front of the d_anchor list |
| 3g: | | increment the deep_lock count in M by 1 |
| 3h: | | the locking process terminates |
| 4: | else | |
| 4a: | | call lock-C( ) to lock the object |
| 4b: | | the locking process terminates when lock-0( ) completes |

The initial locking routine lock-0( ) utilizes a "compare and swap" function shown in Line 1 of the pseudocode listing. The compare and swap function provides a mechanism to manage contention. The function atomically compares the four byte memory location &mte referenced by the monitor transition element field 23 to the referenced address &e0 for equality, and assigns a value to the pointer t_Anchor( ) if the comparison succeeds, i.e. the pointer t_Anchor( ) is equal to location of the first transition element 32a or &e1(tid). The function returns a Boolean value result based on the success of the comparison (Line 1) which is used to determine whether the current thread owns a lock on the object (Line 2). If the result of the compare and swap operation is TRUE (Line 3), then the swap has succeeded and the locking process terminates (Line 3a). If the Boolean result is FALSE (Line 2), then another thread has a lock on the object 22 (Line 4). Accordingly, the thread updates the wait_list field 24 of the object 22 (Line 4a) and waits until it can obtain the initial lock function lock-0( ) for the object 22 (Line 4b). To indicate that a thread is waiting to lock the object 22, the wait_list field 24 is updated as necessary with a non-zero value.

As will be understood by those skilled in the art, the compare and swap function can be implemented on a number of hardware platforms using machine instructions. For the Intel hardware platform, the LOCK CMPXCHG instruction is used in a multi-processor environment and the CMPXCHG instruction is used in a uni-processor environment.

Reference is next made to the pseudocode listings for the shallow locking routines lock-1( ) to lock-N-1( ). The shallow locking routines lock-1( ) to lock-N-1( ) utilize a function currentThreadOwnsLock(o) as shown in Line 1. The function returns a Boolean value result (Line 1) which is used to determine whether the current thread owns a lock on the object. If the Boolean result is TRUE (Line 2), then the current thread owns a lock on the object (Line 3). Accordingly, the monitor transition element field 23 is incremented by 12 to point to the next monitor transition element 34 in the vector 30 (Line 3a), and the locking process is terminated (Line 3b). It will be appreciated that the 12 corresponds to the 12 byte size (i.e. 4 bytes for each field 34, 36, 38 in FIG. 2) of a monitor transition element 32. If the Boolean result is FALSE (Line 2), then the current thread does not own a lock on the object (Line 4). Accordingly, the initial locking function lock-0( ) or 34a is called in order to lock the object (Line 4a), and the locking process terminates when the function lock-0( ) completes (Line 4b).

The currentThreadOwnsLock( ) function may be implemented as a function which compares the identifier of the current thread, obtained in a platform dependant manner, with the value tid. The value tid is indirectly accessible from monitor transition element field 23 of the object 22.

On platforms where t_anchor is used to double as both the thread ID and the address of Per thread data, a faster alternative implementation is possible. A tailored version of the currentThreadOwnsLock( ) function may be provided for each of the locking functions lock-K( ) by observing that the value for monitor transition element field 23 is t_anchor+12(K−1) for the thread owning the lock on the object.

Reference is next made to the pseudocode listing for the shallow locking routine lock-N( ). The shallow locking routine lock-N( ) also utilizes the function currentThreadOwnsLock(o) (Line 1). The function returns a Boolean value result (Line 1) which is used to determine whether the current thread owns a lock on the object (Line 2). If Boolean result is TRUE (Line 2), then the current thread has a lock on the object 22 (Line 3), and the following operations are performed. The monitor transition element field 23 in the object 22 is incremented by 12 to point to the element eDeep or 32m in the monitor transition vector 30 (Line 3a). Next, the linked list 40 or d_anchor is searched for a free entry (Line 3b). If a free entry is not found, then an entry is allocated. The entry is named "M" and moved to the front of the linked list 40 or d_anchor (Line 3c). Next, the deep lock count field 45 is set to 1 (Line 3d) and the field 44 or &OBJECT-i is set to the object reference (Line 3e). The locking process is now complete and terminates (Line 3f). If the Boolean result( is FALSE (Line 2), then another thread has a lock on the object (Line 4). Accordingly, the process for initially locking the object is initiated (Line 4a) by calling the initial locking routine lock-0( ) as described above. The locking process is terminated when the initial locking routine lock-0( ) has completed (Line 4b).

Reference is next made to the pseudocode listing associated with the deep locking routine lock-Deep( ). The deep locking routine lock-Deep( ) utilizes the function currentThreadOwnsLock( ). The function returns a Boolean value result (Line 1) which is used to determine whether the current thread owns a lock on the object 22 (Line 2). If the Boolean value return is TRUE (Line 2), then the current thread has a lock on the object (Line 3). Next, the routine lock-Deep( ) checks if the first object (i.e. "M" in Line 3a) at the head of the linked list 40 or d_anchor is the current object by comparing the value at &OBJECT-i (i.e. "F" in Line 3b) with the current object reference (Line 3c). If the objects do not match (Line 3d), the linked list d_anchor is searched for an &OBJECT-i field equal to object to be unlocked (Line 3e). This search should always succeed. The located object, i.e. "M", is then moved to the head of the list d_anchor (Line 3f). The deep locking routine then increments the value in the deep lock count field 45 for the entry at the head of the d_anchor list (Line 3g), and the locking process is terminated (Line 3h). If the first object in the linked list 40 is the current object (Line 3c), the deep lock count is incremented by 1 (Line 3g) and the locking process terminates (Line 3h). If the Boolean result is FALSE (Line 4), then another thread has a lock on the object, and the process for the initial locking routine lock-0( ) is initiated to lock the object (Line 4a). The initial locking routine lock-0( ) is described above. The locking process terminates once the locking routine lock-0( ) has completed (Line 4b).

The locking routines for unstructured locking are implemented in the same fashion as the structured locking routines described above.

The implementation of the structured unlocking routines will now be described with reference to the following pseudocode listings.

```
The invalid unlocking routine unlock-0( ):
        1:   throw an exception.
The initial unlocking routine unlock-1( ):
        0:   result = currentThreadOwnsLock(o)
        0a:  if (result == FALSE)
        0b:  then
        0c:         throw an exception.
        1:   assign &e0 to the mte field of the object.
        2:   if (wait_list field of object is 0)
        3:   then
        3a:         the unlocking process terminates
        4:   else
        4a:         a thread is awakened where it can contend for the lock
        4b:         the unlocking process terminates
The shallow unlocking routines unlock-2( )-unlockN( ):
        0:   result currentThreadOwnsLock(o)
        0a:  if (result == FALSE)
        0b:  then
        0c:         throw an exception
        1:   decrement the mte field of the object by 12.
        2:   The unlocking process terminates
The deep unlocking routine unlock-Deep( ):
        0:   result = currentThreadOwnsLock(o):
        0a:  if (result == FALSE)
        0b:  then
        0c:         throw an exception
        1:   M = the first object at the head of the d_anchor list
        2:   F = the value of the &OBJECT-i of M
        3:   if (F is NOT the object to be be unlocked
        4:   then
        4a:         M = the entry in the d_anchor list with an &OBJECT-i fiel d
                    whose value is equal to the object to be unlocked
        4b:         move M to the head of the d_anchor list
        5:   decrement the deep_lock count in M by 1.
        6:   if (deep lock count is not 0)
        7:   then
        7a:         the unlocking process terminates
        8:   else
        8a:         set the &OBJECT-i field of M to zero
        8b:         decrement the mte field of the object by 12.
        8c:         the unlocking process terminates
```

In the pseudocode listing shown above, additional steps denoted by Lines 0, 0a, 0b, 0c are provided for unstructured locking as will also be described below. It will be understood that an implementation of structured and unstructured locking requires two sets of monitor transition vectors.

Reference is first made to the pseudocode listing for the invalid unlocking routine unlock-0( ). As shown, the initial routine unlock-0( ) throws an exception if invoked by a thread (Line 1). The exception is generated because the current thread (or any other thread) does not yet have a lock on the object.

Reference is next made to pseudocode listing for the unlocking routine unlock-1( ). The first step in the unlocking routine unlock-1( ) (Line 1) involves updating the monitor transition element field 23 so that another thread can lock the object at this time. The next step (Line 2) involves checking the wait_list field 24 in the object 22 to determine if there any other threads waiting to lock the object 22. If there are no threads waiting to lock the object (Line 3), then the unlocking operation is complete and the routine terminates (Line 3a). On the other hand, if one or more threads are waiting (Line 4), then a thread is awakened so that the thread can contend for the lock (Line 4a). The thread contends with any other threads attempting to also lock the object. The unlocking routine then terminates (Line 4b).

If the unlocking operation is unstructured, then the unlocking routine unlock-1( ) for unstructured locking includes the additional steps at Lines 0, 0a, 0b and 0c. The purpose of these additional steps is to determine if the current thread has a lock on the object. Unlocking the routine unlock-1( ) utilizes the function currentThreadOwnsLock(o) (Line 0). The function returns a Boolean value result which is used to determine whether the current thread owns a lock on the object (Line 0a). If the Boolean result is FALSE (Line 0b), then the current thread does not own a lock on the object, and accordingly an exception is thrown (Line 0c).

Reference is next made to the pseudocode listing for the shallow unlocking routines unlock-2( )-unlock-N( ). The shallow unlocking routines include an operation to update the monitor transition element field 23 to the previous element 32 in the monitor transition vector 30. This operation involves decrementing the value stored in the transition element field 23 by 12 (Line 1). For the embodiment shown in FIG. 2 and described above, each transition element 32 in the vector 30 comprises 12 bytes. Once the value is decremented, the unlocking routine terminates (Line 2).

If the unlocking operation is unstructured, then the shallow unlocking routines unlock-2( )-unlock-N( ) include the additional steps at Lines 0, 0a, 0b and 0c. As shown, the routine utilizes the function currentThreadOwnsLock(o) (Line 0). The function returns a Boolean value result (Line 0) which is used to determine whether the current thread owns a lock on the object (Line 0a). If the Boolean result is FALSE (Line 0b), then the current thread does not own a lock on the object, and accordingly an exception is thrown (Line 0c).

Reference is next made to the pseudocode listing for the deep unlocking routine unlock-Deep( ). The deep unlocking routine unlock-Deep( ) first determines if the object at the head of the linked list d__anchor is the current object. This operation involves assigning the first object in the list to the variable "M" (Line 1) and then assigning the address of the object (obtained from M) to the variable "F" (Line 2). Next, the object reference, i.e. F, is compared to the current object reference (Line 3). If the current object is not at the top of the linked list d__anchor (Line 4), then a search is made for the entry in the linked list d__anchor corresponding to the current object to be unlocked (Line 4a). Next, the located entry, i.e. "M", is moved to the head of the d__anchor list (Line 4b). Next, the deep__lock count in "M" is decremented by 1 (Line 5). It will be appreciated that this decrement is done for the path where M is moved to the front of the list d__anchor and also for the path where M is not moved to the front of the list, i.e. the object being unlocked corresponds to the current object. Next, the decremented deep__lock count is compared to zero (Line 6). If the deep__lock count 45 is not zero, a deep lock still exists (Line 7) and the unlocking process terminates (Line 7a). If the deep__lock count is zero (Line 8), then a regression to shallow locking is required. To perform this operation, the object reference field 44 in the monitor control block 42 is set to zero (Line 8a). Next, the monitor transition element field 23 of the object 22 is decremented by 12 (Line 8a), i.e. the value in the transition element field 23 is set to point to the last shallow locking element 32n or eN(tid). The unlocking process then terminates (Line 8c).

If the unlocking operation is unstructured, then the deep unlocking routine unlock-Deep( ) includes the additional steps at Lines 0, 0a, 0b and 0c. The routine unlock-Deep( ) utilizes the function currentThreadOwnsLock(o) as shown in Line 0. The function returns a Boolean value result (Line 0) which is used to determine whether the current thread owns a lock on the object (Line 0a). If the Boolean result is FALSE (Line 0b), then the current thread does not own a lock on the object, and accordingly an exception is thrown (Line 0c).

To improve the operation of the deep locking routine lock-Deep( ), two enhancements may be made. First, the monitor control blocks 42 for the d__anchor list are allocated out of a thread specific pool. Second, free entries in the list d__anchor, except the initial one assigned to list, are returned to this thread specific pool.

Figure 3:
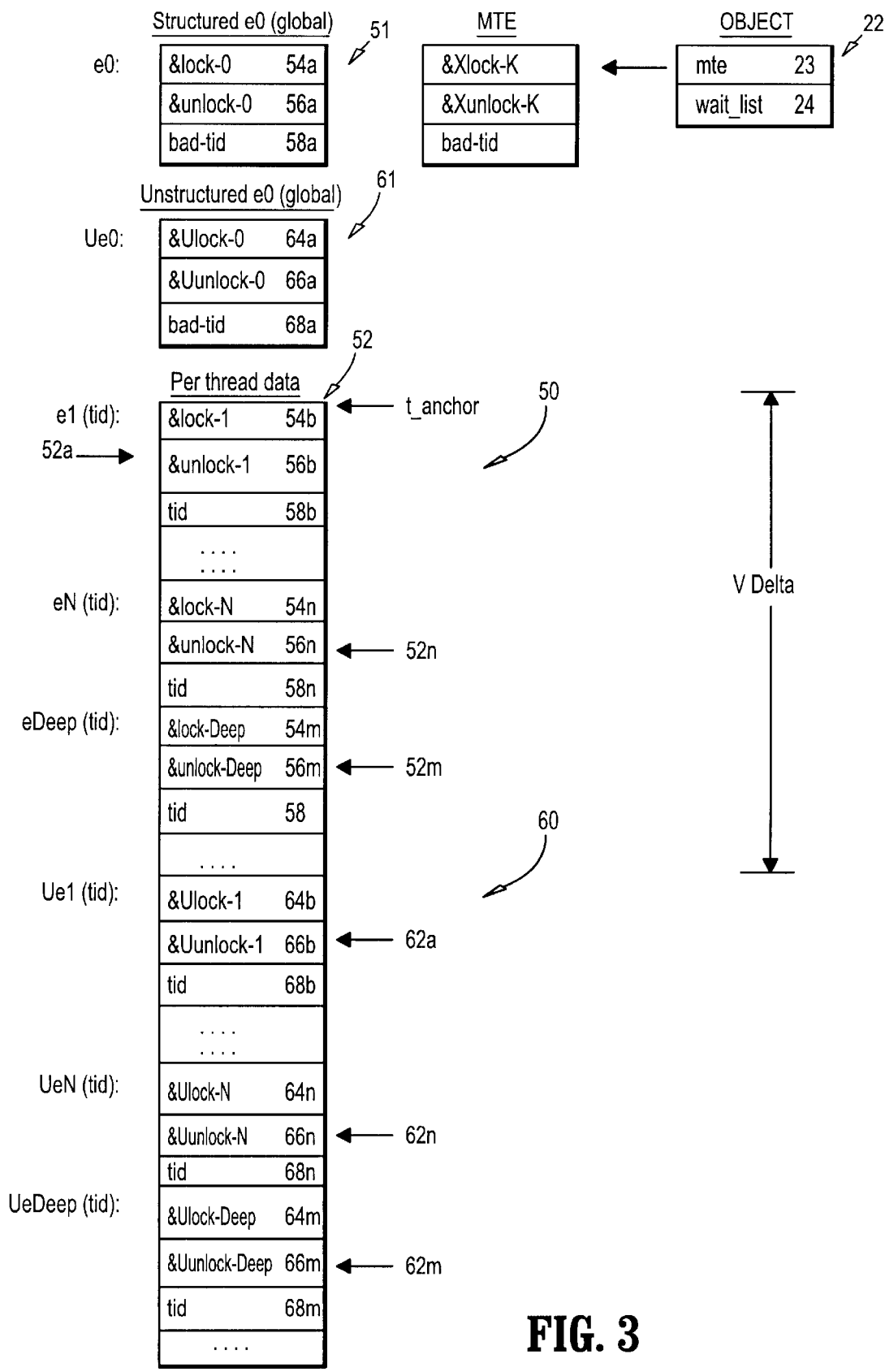
FIG. 3 is a schematic representation of a structured transition vector and an unstructured transition vector for the embodiment of FIG. 2.

To provide unstructured locking, two monitor transition vectors 50, 60 are required. As shown in FIG. 3, each of the vectors 50, 60 has the same basic structure of the vector 30 described above. The monitor transition vectors 50, 60 include a first monitor transition element 51, 61 (e0) which resides in global storage and remaining monitor transition elements 52, 62 (e1-eN and eDeep) which reside in storage local to the thread. The respective monitor transition elements 52, 64 are shown individually as 52a, . . . , 52n, 52m and as 62a, . . . , 62n, 62m in FIG. 3.

Each of the monitor transition elements 51, 52 for the structured vector 50 comprises a structure having two function pointers: &lock 54 and &unlock 56. The transition elements 51, 52 include an additional field 58 for storing a thread identifier or lid. Similarly, each of the monitor transition elements 61, 62 for the unstructured vector 60 comprises a structure having two function pointers: &Ulock 64 and &Ulock 66. The transition elements 61, 62 include an additional field 68 for storing a thread identifier or tid. To simplify the casting operation as described below, the vectors 50, 60 have the same number of elements 52, 62 and vDelta is the byte offset between the associated elements in the different vectors 50, 60. There are however two primary differences between the structured monitor transition vector 50 and the unstructured monitor transition vector 60. First, the unlocking routines 56 in the structured vector 50 do not include a lock ownership test (i.e. currentThreadOwnsLock (o) described above) while this test is performed for the unstructured vector 60. It will be understood that the test is not necessary in the structured case as lock ownership is guaranteed. Second, the structured vector 50 includes its own initial element 51 or e0 which is a global, and the unstructured vector 60 also includes its own initial element 61, which is also a global. It will be appreciated that the initial elements 51, 61 (i.e. e0) are in global storage and are not thread specific since the addresses of the elements 51, 61 are assigned to the monitor transition element field of the object when the object is created and when the object is eventually unlocked by the unlocking function for lock-1( ). In other words, the monitor transition element field of an unlocked object has no associated thread specific locking data.

An implementation consideration is that a thread references the monitor transition elements, i.e. e1(tid)-eN(tid), eDeep(tid), of a monitor transition vector of another thread. As described above, the monitor transition elements e1(tid) -eN(tid),eDeep(tid) comprise the "Per thread data" for the particular thread. In order to handle the situation where the thread containing these elements terminates before the reference from the other thread is complete, the storage of Per thread data which contains the structured locking vector is never de-allocated but is recycled, i.e. added to a recycling bin. When added to the recycling bin, the function pointers in the vector are left intact but the lid field is set to an invalid thread ID. The former is necessary in order for an algorithm to properly work. Support for cross thread casting gives rise to additional considerations as will be described below.

According to this embodiment, casting is implemented as an operation which may update the monitor transition element field 23 of the object 22 to point to an element 62 in the unstructured vector 60. In the following description, the casting operation is performed between the elements 52, 62 (i.e. e1-eN or eDeep). The initial elements 51, 61 (i.e. e0) are not involved. In the application of cross thread casting described below, where casting is used to eliminate the wait__list field of the object, the casting operation involves additional sets of transition vectors.

The implementation of the casting operation will now be described with reference to the following pseudocode listing.

cast (castType, cast)
1:   element = monitor transition element field of the object
2:   sourceType = the type of the object
3:   if (sourceType == castType)
3a:  then

| | |
|---|---|
| 3b: | the casting operation is complete |
| 4: else | |
| 4a: | Y = address of the appropriate monitor transition element of the new type |
| 4b: | assign Y to the monitor transition element field of the object |
| 4c: | the casting operation is complete. |

The first step in the cast routine involves referencing the monitor transition element field 23 in the object 22 (Line 1). Next, the sourceType is determined from the type of the element (Line 2). The sourceType is then compared to the castType (Line 3). If the castType and sourceType are the same (Line 3a), then there is nothing to do because the object is already of the appropriate type, i.e. the casting operation is complete (Line 3b). If the castType and the sourceType are different (Line 4), then the address of the associated monitor transition element 52 or 62 in the new vector 50 or 60 type needs to be determined (Line 4a). Referring to FIG. 3, if casting from a structured locking operation to an unstructured locking operation, then vDelta is added to the address of the current monitor transition element 52 to obtain the corresponding transition element 62 in the unstructured vector 60. The address of the new transition element 62 is then assigned to the object 22 (Line 4b), and the casting operation is complete (Line 4c).

In order to accommodate the situation where a thread is trying to acquire a first time lock on a monitor it believes to be of type X (e.g. structured), but the type has been changed to Y (e.g. unstructured), an additional check is included. When the lock stealing code (i.e. cornpareAndSwap) fails, the thread checks if the type of the monitor has changed. If the type has changed, then the thread invokes the lock routine that is currently associated with the monitor.

The need for the wait list field 24 in the object 22 may be eliminated by utilizing the "cross thread casting" feature to manage contention as follows. Two additional types, i.e. monitor transition vectors, are provided: (1) a structured vector with "waiters" type, and (2) an unstructured vector with "waiters" type. When a thread fails to acquire a lock because the lock is held by another thread, the object is cross thread cast to one of the new vector types, i.e. structured waiters vector or unstructured waiters vector.

Casting is implemented using the compareandSwap function. When the thread which owns the lock attempts to release the lock (i.e. by assigning the initial element 51, 61 or e0 in FIG. 3 to the monitor transition element field of the object) using the function compareAndSwap, the compareAndSwap may fail. A failure to release the lock indicates that another thread has performed the cast operation. In response to the failure to release the lock, the thread owning the lock releases it appropriately and then gives the waiting thread(s) the proper attention. When the thread that was waiting, or another thread for that matter, gains control of the lock, the casted type remains the same and is not changed back. The type could remain the same for some time since there could be a queue of waiters by this time. When the queue of waiters is empty and the last waiter is about to release the lock, it notices that there are no other waiting threads and, at this time, casts the type back to one without waiters.

It will be appreciated that with this approach, all updates to the monitor transition element field of the object are performed using the compareAndSwap function. This update is performed both by the thread which owns the lock and by threads contending for the lock, the code for the locking and unlocking needs to be suitably modified to take this into account. Since updates to the monitor transition element field of the object are performed by nested locking and unlocking routines, this particular utilization of the compareAndSwap function will impact nested locking performance.

While cross thread casting will impact nested locking performance, "cross thread plumbing" does not. Cross thread plumbing may also be used to manage contention and thereby eliminate the need for the wait list field 24 in the object 22. When a thread is unable to acquire a lock because the lock is held by another thread, the thread posts a request on the thread owning the lock. The posted request indicates that there is some thread waiting on a lock held by the thread with the post. The posting can be implemented by using cross thread plumbing to change the function pointer of the structured unlock routine, i.e. unlock-1( ), in the monitor transition vector to a different value. The fact that the function pointer has a value different from its default is an indication of the post. For that matter, any location in Per thread data can be used and it need not be a location in a monitor transition vector. It will be understood that in a sense, this field replaces the wait_list field of the object, with the exception that this field could be modified for any or all objects owned by that thread and not just for a particular object.

In another aspect, the mechanism 1 according to the invention allows for the reduction of synchronization overhead in applications which are single threaded. The technique is as follows. When the virtual machine is started, the initial locking and unlocking routines for structured locking do not need to consider contention for the initial thread. The "compare and swap" function described above for initially grabbing a lock on an object may be replaced by a store operation into the monitor transition element field of the object. Similarly, the nested lock routines do not need to perform lock ownership or wait_list contention tests.

When a second thread is created, the locking routines for the single thread are replaced by routines which consider contention as described above. The plumbing operation is utilized to replace the locking routines prior to the creation of the second thread. In the first embodiment which uses thread specific storage, global and thread specific plumbing techniques are used as described above. In the second embodiment described below, the global plumbing operation is used.

It will however be appreciated by those skilled in the art that this technique is not entirely suitable for a virtual machine environment where the second thread is attached or created by a thread other than the initial thread.

Figure 4:
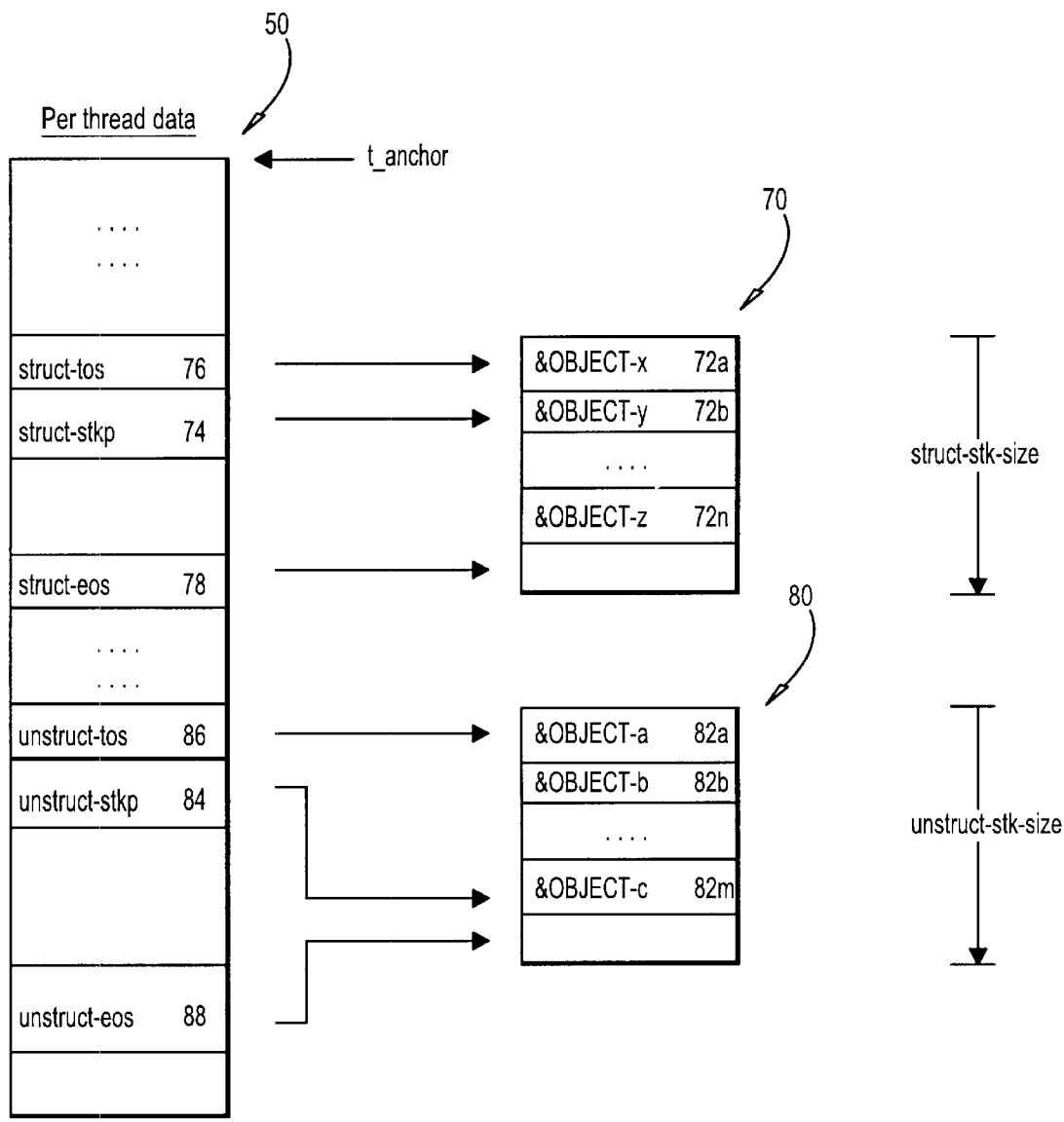
FIG. 4 is a schematic representation of data structures according to the invention for tracking the set of objects locked by a particular thread.

The mechanism for distinguishing structured and unstructured locking also provides a means for efficiently tracking monitors. Reference is made to FIG. 4 which shows data structures according to this aspect of the invention. The data structures comprise a structured locking stack 70 and an unstructured locking stack 80. The stacks 70, 80 allow locks acquired by structured locking operations to be tracked in one manner and locks acquired by unstructured locking operations to be tracked in another manner.

As shown in FIG. 4, the structured locking stack 70 comprises a series of locations 72, which are shown individually as 72a, 72b, . . . , 72n. When a structured lock is performed on an object, a reference &OBJECT-X to the object is pushed onto the next location 72 in the structured stack 70.

The next available location 72 in the stack 70 for an object reference &OBJECT-X is indicated by a stack pointer 74 or struct-stkp. The pointer 74 is stored in a portion of the per thread data, and is updated after an object reference &OBJECT-X is pushed onto the stack 70. The top and end of the stack 70 are marked by pointers 76 or struct-tos and 78 or struct-eos, respectively. These pointers 76, 78 are modified if the stack 70 is allowed to grow. The unstructured locking stack 80 has a similar organization with locations 82, pointer 84 or unstruct-stkp, pointer 86 or unstruct-tos, and pointer 88 or unstruct-eos.

In operation, an object that is locked by a thread is pushed onto either the structured locking stack 70 or onto the unstructured locking stack 80. The object (i.e. the pointer to the object) is pushed onto the appropriate stack during an initial lock operation. An object is popped from the appropriate stack 70 or 80 during the last unlock operation. During a casting operation, an object will be moved from the structured locking stack 70 to the unstructured locking stack 80 when the type changes from structured to unstructured. The "push" and "pop" operations for the structured locking stack 70 can be done efficiently since only the top entry ever needs to be considered. The stack pointer struct-stkp and the other pointers 76, 78 are at a constant displacement from the monitor transition element 52 referenced by the value in the monitor transition element field 23 stored in the object 22. As such, the object references in the stack 70 may be retrieved using one level of indirection. As such there is no need for special checking code, except possibly, for stack overflow on a push operation.

Figure 5:
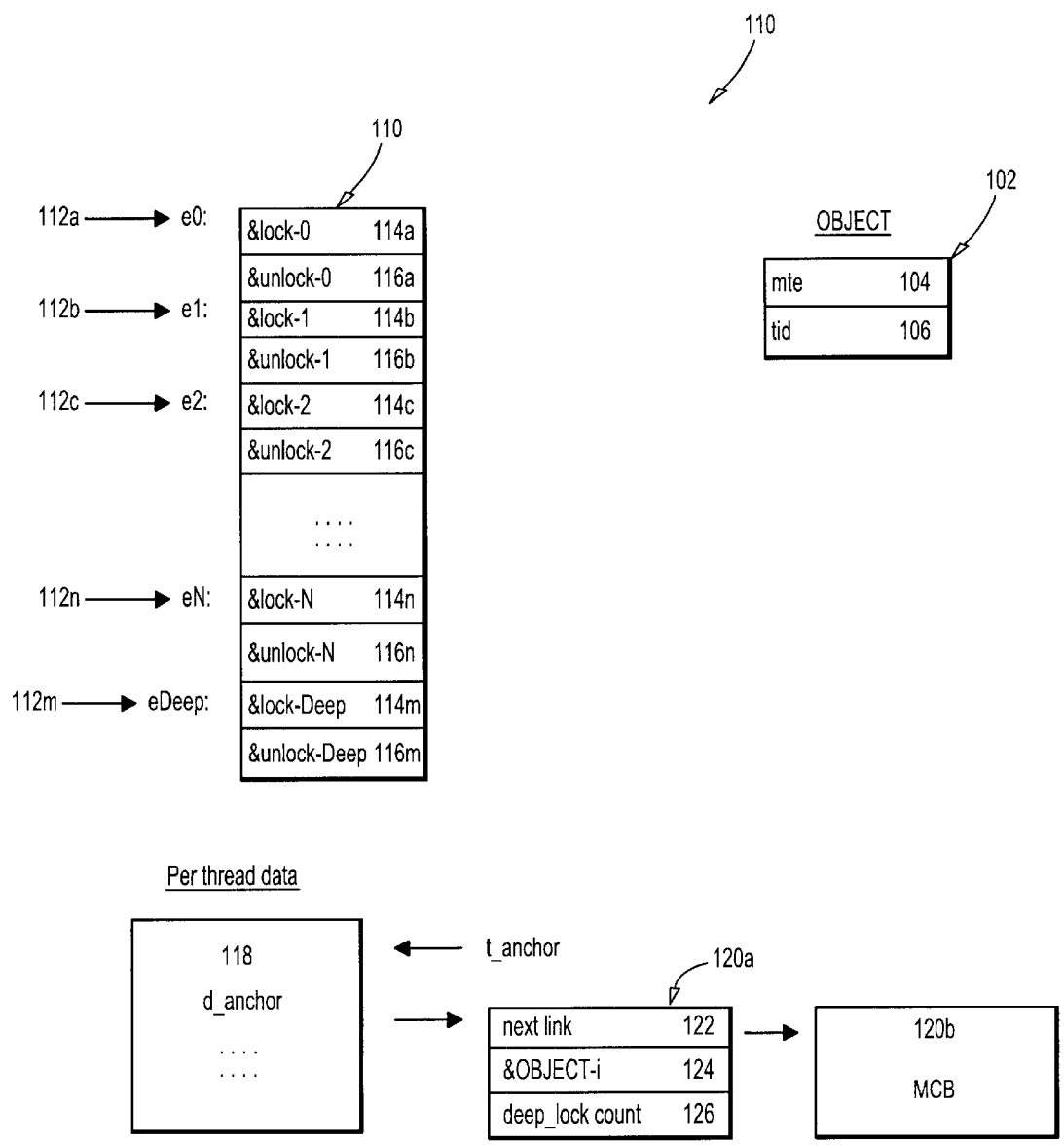
FIG. 5 is a schematic representation of a mechanism according to another embodiment of the present invention.

In a second embodiment of a mechanism 100 according to the present invention, the monitor transition vector(s) are stored in global memory. As shown in FIG. 5, the mechanism 100 includes one or more monitor transition vectors 110. The organization of the monitor transition vector 110 is very similar to the monitor transition vector 10 described above, except the vector 110 according to this embodiment is stored in global memory. The monitor transition vector 110 is referenced by an object 102. The object 102 includes a monitor transition element field 104 and a thread identifier field 106. The monitor transition vector 110 comprises an ordered set of monitor transition elements 112, shown individually as 112a, 112b, 112c, . . . , 112n, 112m. When the object 102 is initially created, the monitor transition element field 104 in the object 102 stores the address or a pointer to the first monitor transition element 112a or e0 in the monitor transition vector 110. During subsequent lock and unlock operations, the monitor transition element 112 currently assigned to the object 102 is updated.

As described above, each monitor transition element 112 is implemented as a structure containing two function pointers: &lock 114 and &unlock 116. The &lock pointers 114, shown individually as 114a, 114b, 114c, . . . , 114n, 114m, each reference a locking transition function lock-K( ), whereas the &unlock pointers, shown individually as 116a, 116b, 116c, . . . , 116n, 116m, each reference an unlocking transition function unlock-K( ).

Referring to FIG. 5, the locking functions lock-0( ) to lock-Deep( ) form a set of N+2 functions used for structured locking of an object 102. The initial locking function lock-0( ) is used to acquire the first lock on the object 102. The locking functions lock-1( ) to lock-N( ) are used to acquire the next N shallow locks on the object 102. The deep locking function lock-Deep( ) is used to acquire all further, i.e. deep, locks on the object 102.

Similarly, the unlocking functions unlock-0( ) to unlock-Deep( ) form a set of N+2 functions used for structured unlocking of the object 102. The initial unlocking function unlock-0( ) merely generates an exception because it is illegal to unlock an object that is not locked. The unlocking functions unlock-1( ) to unlock-N( ) are used to unlock an object 102 that has a lock count from 1-N respectively. The deep unlocking function unlock-Deep( ) is used to unlock an object 102 that has a deep_lock count.

While, the monitor transition vector 110 is kept in global memory, the mechanism 100 includes thread specific storage 118 for data that is unique to each thread. As shown in FIG. 5, a linked list d_anchor is maintained in the thread specific storage 118. The base address of the thread specific storage 118 is given by a pointer t_anchor. As described above, a function t_Anchor( ) is used by a thread to determine its t_anchor value. The function t_Anchor( ) is also required by the deep lock routines (i.e. lock-Deep( ) and unlock-Deep( ) when allocating or updating a monitor control block 120. The linked list d_anchor references a list of monitor control blocks 120 (shown individually as 120a, 120b, . . . ) or MCB's which are used by the deep locking lock-Deep( ) and unlocking unlock-Deep( ) routines. The monitor control blocks are also kept in thread specific storage 118, i.e. Per thread data. The list d_anchor includes an entry for each object that is deeply locked by the thread.

As shown in FIG. 5, the monitor control block 120 comprises a next link field 122, an object reference field 124, and a deep lock count field 126. The next link field 122 holds the address of the next monitor control block 120b in the list. The object reference field 124 stores an object reference &OBJECT-i for the deeply locked object. A zero value in object reference field 124 indicates that the monitor control block 120 is not being used. The deep lock count field 126 stores a value which indicates the number of calls to the deep locking routine lock-Deep( ). A non-zero value of M indicates there have been M-1 deep lock requests.

In a typical 32-bit environment, the monitor transition element 104 comprises a 4 byte field and the thread identifier field 106 also comprises a 4 byte field. This represents the storage requirement in the object 102 for synchronization. When an object 102 is created, the monitor transition element field 104 is assigned the address of the first monitor transition element 112a or e0 in the vector 110. The monitor transition element field 104 is subsequently updated by the locking lock-K( ) and unlocking unlock-K( ) routines and by the casting operation. At any point in time, the monitor transition element field 104 will contain the address of one of the locking routines 114 lock-K( ) or lock-Deep( ). In this embodiment, the thread identifier tid is stored in a field 106 in the object 102. The field 106 holds the identifier of the thread owning a lock on the object 102.

It will be appreciated that the mechanism 100 according to this embodiment does not include a wait_list field 24 (FIG. 3). Accordingly, wait_list management for contention control is performed using the cross thread casting technique as described above. This means that a compareAndSwap operation is needed for each store into the monitor transition element field 104 of the object 102. If a wait_list field is added to the object, compareAndSwap usage can be minimized. It will be appreciated that the cross thread plumbing operation is not supported because all plumbing is global.

For the first embodiment described above which exploits thread specific storage, the "Per thread data" needed to be recycled since portions of the monitor transition vectors 50, 60 (FIG. 3) were kept in thread specific data. For the mechanism 100 shown in FIG. 5, this requirement is eliminated since the transition vectors 110 are kept in global storage.

In order to allow tracking of the objects locked by a given thread as described above for the first embodiment, the value t_anchor is required by the initial locking lock-0 and unlocking unlock-0 routines.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or privilege is claimed are defined as follows:

1. A mechanism for managing the locking and unlocking of an object by a thread, said mechanism comprising:
   (a) a transition vector having a plurality of ordered transition elements, each of said plurality of ordered transition-elements being separate from, and not part of, the object or a data structure of the object;
   (b) a reference element for referencing one of the transition elements in said transition vector, and said reference element being accessible in the object;
   (c) each of said transition elements including locking means for locking the object and unlocking means for unlocking the object;
   (d) said locking means having means for assigning said reference element to the next transition element in response to a locking request for the object by the thread; and
   (e) said unlocking means having means for assigning said reference element to the previous element in response to an unlocking request for the object by the thread.

2. The mechanism as claimed in claim 1, further including means for providing a lock count indicative of the number of locks on the object.

3. The mechanism as claimed in claim 1, wherein said transition vector comprises a contiguous array of elements stored in memory.

4. The mechanism as claimed in claim 3, wherein said ordered transition elements comprise an initial transition element, a plurality of shallow-locking transition elements, and a deep locking transition element.

5. The mechanism as claimed in claim 4, wherein said initial transition element is stored in global memory.

6. The mechanism as claimed in claim 5, wherein said shallow-locking transition elements and said deep locking transition element are stored in memory specific to the thread operating on the object.

7. The mechanism as claimed in claim 1, wherein said locking means comprises a locking function and said unlocking means comprises an unlocking function, and said transition element comprises a structure having first and second function pointers, said first function pointer referencing said locking function and said second function pointer referencing said unlocking function.

8. The mechanism as claimed in claim 1, further including casting means for changing the transition vector assigned to said object, said casting means comprising means for modifying said reference element wherein said reference element references a transition element in another transition vector.

9. The mechanism as claimed in claim 8, wherein said first transition vector comprises a transition vector for structured locking and unlocking of the object, and said second transition vector comprises a transition vector for unstructured locking and unlocking.

10. The mechanism as claimed in claim 1, further including plumbing means for modifying said locking means or said unlocking means in one of said transition elements.

11. The mechanism as claimed in claim 1, further including cross-thread casting means for changing the transition vector assigned to said object to a transition vector in another thread, said cross-thread casting means comprising means for modifying said reference element wherein said reference element references a transition element in the transition vector for said other thread.

12. The mechanism as claimed in claim 1, further including cross-thread plumbing means for modifying locking means or unlocking means in a transition element wherein said transition vector belongs to another thread.

13. A method for managing the locking and unlocking of an object by a thread, said method utilizing a transition vector comprising an ordered set of transition elements and each of said transition elements comprising a structure having first and second function pointers, said first function pointer referencing a locking function for locking said object and said second function pointer referencing an unlocking function for unlocking said object, said method comprising the steps of:
   (a) assigning a transition vector to an object when the object is created, wherein a reference element in the object is assigned to the first transition element in the transition vector;
   (b) invoking the locking function in the currently referenced transition element in response to a request from the thread to lock the object, and assigning said reference element to the next transition element in the transition vector;
   (c) invoking the unlocking function in the currently assigned transition element in response to a request from the thread to unlock the object, and assigning said reference element to the previous transition element in the transition vector;
   (d) generating an exception in step (c) if a request is made by a thread to unlock an object which has not been locked, wherein each of the transition elements in the ordered set of transition elements is separate from, and not part of, the object or a data structure of the object.

14. The method as claimed in claim 13, further including steps for invoking a deep locking function when the lock requests for the object exceed a lock threshold.

15. The method as claimed in claim 13, further including steps for changing the transition vector assigned to the object comprising assigning the reference element in said object to a transition element in another transition vector so that said reference element references said other transition vector.

16. The method as claimed in claim 13, wherein said first transition vector is utilized for structured locking and unlocking of the object and said second transition vector is utilized for unstructured locking and unlocking of the object.

17. The method as claimed in claim 13, further including steps for modifying said locking and unlocking functions in one or more of said transition elements.

18. The method as claimed in claim 13, further including steps for modifying said locking and unlocking functions in one or more said transition elements, wherein said transition elements belong to a transition vector assigned to an object in another thread.

19. The method according to claim 13, wherein said method is implemented by a program storage device readable by machine, tangibly embodying a program of instructions executable by the machine to perform said method steps.

20. The mechanism as claimed in claim 1, wherein said mechanism provides one level of indirection from the object to said locking means and the one level of indirection from the object to said unlocking means, through said reference element.

21. The mechanism as claimed in claim 1, wherein the transition vector includes the plurality of ordered transition elements therein, such that no references exist from the transition vector itself to any of the plurality of ordered transition elements.

22. The method as claimed in claim 13, wherein the transition vector comprises the ordered set of transition elements therein, such that no references exist from the transition vector itself to any of the transition elements in the ordered set of transition elements.

23. The mechanism as claimed in claim 1, wherein said means for assigning said reference element to the previous transition element assigns said reference element to the previous transition element in response to the unlocking request for the object by the thread irrespective of a corresponding state of any other objects in a same class as the object.

* * * * *